(Model.)
J. W. WADSWORTH.
NUT LOCK.
No. 244,004. Patented July 5, 1881.
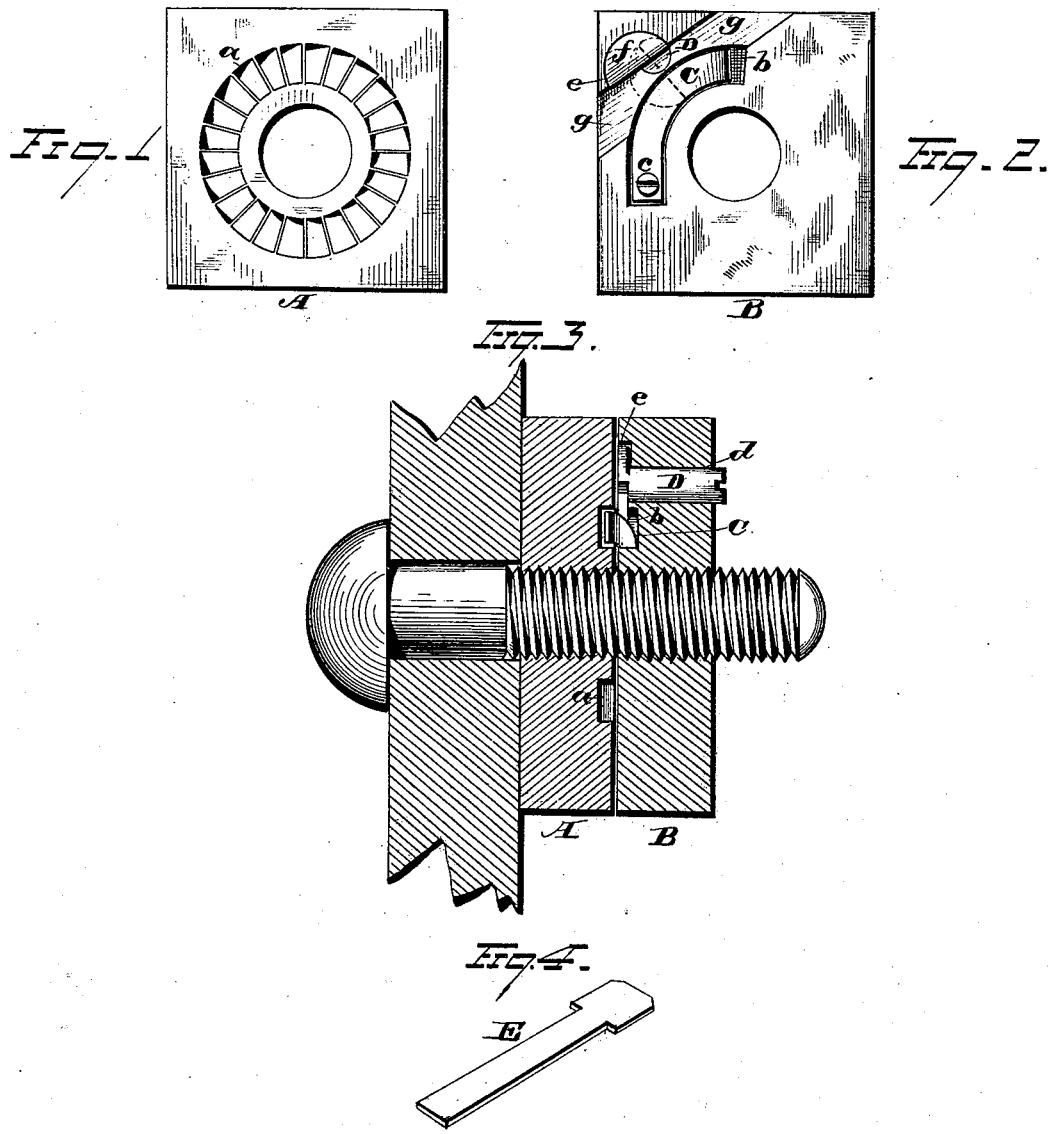

UNITED STATES PATENT OFFICE.

JOHN W. WADSWORTH, OF ALLEGHENY CITY, PENNSYLVANIA.

NUT-LOCK.

SPECIFICATION forming part of Letters Patent No. 244,004, dated July 5, 1881.

Application filed November 12, 1880. (Model.)

*To all whom it may concern:*

Be it known that I, J. W. WADSWORTH, of Allegheny city, in the county of Allegheny and State of Pennsylvania, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention employs two nuts, one of which has its face provided with a circular rack. The other nut has its face provided with a recess in which a spring is fitted. This spring normally engages with the rack as the two nuts come in face contact with each other, thereby locking said nuts together, so that they cannot turn on the bolt. A rotary pin passes from the outer to the inner face of the nut, the inner end of the pin being provided with a cam adapted to hold the spring free from the rack when the pin is suitably rotated.

In the drawings, Figure 1 is a plan view of the nut provided with the circular rack. Fig. 2 is a plan view of the nut provided with the spring. Fig. 3 is a sectional view of the two nuts locked together on a bolt. Fig. 4 is a view of a device adapted to serve in the capacity of a screw-driver to turn the rotary pin, and also as a key to press the spring free from the rack.

One face of a nut, A, is provided with a circular rack, $a$, this nut being run on the bolt first with its rack-face exposed. The other nut, B, has its inner face provided with a curved recess, $b$, in which is fitted a spring, C. One extremity of the spring is secured in position by a pin, $c$. The opposite extremity is free and adapted to normally project from the recess, said free extremity being bent in such form that force is necessary to maintain it flush with the inner face of the nut B. A hole, $d$, extends between the two faces of this latter nut, and in this hole is fitted a rotary pin, D. The outer end of the pin is provided with a transverse groove, whereby the pin may be turned by a screw-driver or similar device. The inner end of the pin is provided with a cam, $e$, which works in a countersink, $f$, formed in the inner face of this nut. This cam is adapted, when its pin is suitably rotated, to engage with the spring and maintain its free end flush with the inner face of nut B.

The operation of the device is readily apparent. When the nut B has face contact with nut A the free end of the spring engages with the rack and the two nuts become locked together, so that neither can be turned in either direction on the bolt. To unlock the nuts, the rotary pin may be turned by any suitable means so as to throw the cam in engagement with the spring and free the latter from the rack. The inner face of nut B is further provided with a diagonal groove, $g$, adapted to receive a suitable key, E, the key serving to press the spring out of engagement with the rack. The nut is provided with the two means for unlocking the nut, so that in any particular instance either one may be used; or both may be used at the same time, one auxiliary to the other.

Instead of the nut A, a fish-plate or other bearing-surface may be provided with the circular rack, the result being the same with the employment of any such device in substitution for said nut. The key E is adapted to turn the rotary pin as well as to directly press back the pin.

The nut or washer A may be secured against rotary movement in any desired manner, as such feature constitutes no part of my invention. If the serrated face is formed on a fish-plate, the nut B will, of course, be firmly secured in place, while on the other hand, if the nut or washer A is made separate from the fish-plate or other object, some suitable provision must be made for preventing it from turning.

I am aware that a nut has been recessed on its inner face and a spring-pawl pivoted therein, said pawl being adapted to engage a circular rack on a washer or bar, and thereby hold the nut against displacement. A screw serves to throw the spring-pawl out of engagement with the circular rack or face ratchet-teeth; hence I make no claim to such construction and combination of parts.

My improvement allows of the employment of a comparatively thin nut, as a spring inserted therein serves as a pawl to retain the nut against rotary displacement. This spring may be thrown out of engagement by a rotary cam, which is permanently secured to the nut when locked in place.

The construction of parts is simple and economical in manufacture, and the parts are not liable to become disarranged or impaired in use.

Having fully described my invention, what I claim as new, and desire to secure by Letters Patent, is—

The nut B, having a rotary pin, D, inserted therein, said pin being provided with a cam-head, $e$, adapted to be turned beneath the spring-pawl C and retract it from the ratchet-teeth $a$, substantially as set forth.

In testimony that I claim the foregoing I have hereunto set my hand this 5th day of November, 1880.

JOHN W. WADSWORTH.

Witnesses:
WILLIAM B. KIBLER,
A. C. HENRY.